(12) United States Patent
Zajchowski et al.

(10) Patent No.: US 7,763,823 B2
(45) Date of Patent: *Jul. 27, 2010

(54) METHOD AND APPARATUS FOR MICROPLASMA SPRAY COATING A PORTION OF A COMPRESSOR BLADE IN A GAS TURBINE ENGINE

(75) Inventors: Paul H. Zajchowski, Enfield, CT (US); Donn Blankenship, Southbury, CT (US); Gary C. Shubert, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/976,561

(22) Filed: Oct. 29, 2004

(65) Prior Publication Data

US 2006/0093748 A1    May 4, 2006

(51) Int. Cl.
*B23K 10/00* (2006.01)
(52) U.S. Cl. .............................. 219/76.16; 219/121.47; 219/121.45; 426/446
(58) Field of Classification Search ............ 219/121.47, 219/76.15, 76.16, 121.59, 121.45, 121.5, 219/121.51, 121.48, 121.49, 75, 121.46; 118/715, 723 R, 723 E; 426/446, 469, 457, 426/701, 702, 719
See application file for complete search history.

(56) References Cited

U.S. PATENT DOCUMENTS

| | | | |
|---|---|---|---|
| 4,121,083 A | 10/1978 | Smyth | |
| 4,256,779 A | 3/1981 | Sokol et al. | |
| 4,282,418 A * | 8/1981 | Wuestner | 219/121.5 |
| 4,472,619 A * | 9/1984 | Ueda et al. | 219/76.15 |
| 4,851,636 A * | 7/1989 | Sugimoto et al. | 219/121.59 |
| 5,173,328 A | 12/1992 | Reiter et al. | |
| 5,233,153 A * | 8/1993 | Coats | 219/121.47 |
| 5,271,971 A | 12/1993 | Herb et al. | |
| 5,285,967 A * | 2/1994 | Weidman | 239/80 |
| 5,311,103 A | 5/1994 | Asmussen et al. | |
| 5,556,560 A * | 9/1996 | Ahola et al. | 219/121.45 |
| 5,560,844 A * | 10/1996 | Boulos et al. | 219/121.59 |
| 5,723,078 A | 3/1998 | Nagaraj et al. | |
| 6,042,880 A | 3/2000 | Rigney et al. | |
| 6,238,540 B1 | 5/2001 | Timoshenko et al. | |
| 6,264,817 B1 | 7/2001 | Timoshenko et al. | |
| 6,571,472 B2 | 6/2003 | Berry et al. | |

(Continued)

OTHER PUBLICATIONS

European Search Report for EP Patent Application No. 05256731.0.

(Continued)

*Primary Examiner*—Mark H Paschall
(74) *Attorney, Agent, or Firm*—Bachman & LaPointe, P.C.

(57) ABSTRACT

A method and apparatus for microplasma spray coating a portion of a substrate, such as a gas turbine compressor blade, without masking any portions thereof. The apparatus includes a microplasma gun with an anode, cathode, and an arc generator for generating an electric arc between the anode and cathode. An arc gas emitter injects inert gas through the electric arc. The electric arc is operable for ionizing the gas to create a plasma gas stream. A powder injector injects powdered material into a plasma stream. A localized area of the compressor blade is coated with the powdered material without having to mask the compressor blade.

20 Claims, 4 Drawing Sheets

U.S. PATENT DOCUMENTS

| | | | |
|---|---|---|---|
| 6,703,579 B1 * | 3/2004 | Rice | 219/121.47 |
| 6,744,006 B2 * | 6/2004 | Johnson et al. | 219/121.51 |
| 6,914,210 B2 | 7/2005 | Grossklaus, Jr. et al. | |
| 7,008,522 B2 | 3/2006 | Boucard et al. | |
| 2005/0015980 A1 * | 1/2005 | Kottilingam et al. | 29/888.011 |
| 2005/0067065 A1 * | 3/2005 | Fernihough et al. | 148/512 |

OTHER PUBLICATIONS

Microplasma Spraying Brochure, E.O. Paton Electric Welding Institute of the NAS of Ukraine, 11, Bozhenko st., 03680, Kiev, Ukraine.

* cited by examiner

METHOD AND APPARATUS FOR MICROPLASMA SPRAY COATING A PORTION OF A COMPRESSOR BLADE IN A GAS TURBINE ENGINE

FIELD OF THE INVENTION

The present disclosure generally relates to spray coating methods and apparatus and, more particularly, relates to a method and apparatus for microplasma spray coating a blade root of a compressor blade in a gas turbine engine.

BACKGROUND OF THE DISCLOSURE

Plasma coating methods and apparatus are known. For example, one patent relates to a method and apparatus for plasma flame spray coating material onto a substrate. The patent discloses a method and apparatus for plasma flame spray coating material onto a substrate by means of passing a plasma forming gas through a nozzle electrode, and passing an arc forming current between the nozzle electrode and a rear electrode to form a plasma effluent. The method includes introducing coating material into the plasma effluent, passing the plasma effluent axially through a wall shroud extending from the exit of said nozzle electrode, and forming a flame shroud for the plasma effluent. The coating is thereby applied to the substrate.

One area where such technology is particularly advantageous is in connection with coating various aircraft components, particularly gas turbine engines and their components. For example, the blade roots of compressor blades can be coated with material to meet dimensional tolerance requirements for sealing the compressor blade with the compressor wheel and the like. Metallic coatings consisting of copper-nickel, aluminum-copper, and other similar composition materials have been applied in this regard using various conventional plasma spray coating processes. Typically, the coating process requires the compressor blade to be masked in areas where the material transfer is not required and/or not desired. Furthermore, the compressor blade is typically coated in a dedicated facility such as an aircraft engine manufacturing plant or repair shop. Prior art methods and apparatus required masking the compressor blade and applying the coating in dedicated facilities because the coating equipment was large and not portable and the spray pattern was too wide to accurately control the coating process. It would be desirable to improve the accuracy of spray coating devices so that masking and the like would not be required, as well as permitting hand spray coating repairs in the field of operation.

SUMMARY OF THE DISCLOSURE

In accordance with one aspect of the disclosure, a microplasma spray apparatus for coating at least a portion of a gas turbine compressor blade is provided. A microplasma gun includes an anode, cathode, and an arc generator for generating an electric arc between the anode and cathode. The apparatus includes an arc gas emitter for injecting gas into the electric arc. The electric arc is operable for ionizing the gas to create a plasma gas stream. A powder injector injects powdered material into the plasma gas stream. The compressor blade can be coated in a localized area with the powdered material without masking the compressor blade.

In accordance with another aspect of the present disclosure, a method for microplasma spray coating a gas turbine compressor blade is provided. The method includes providing a microplasma spray gun having an anode and cathode and means for generating an electric arc between the anode and the cathode. Inert arc gas is injected through the electric arc to ionize the gas and form a plasma gas stream. Powdered material is injected into the plasma gas stream. The method provides for coating a localized area of a compressor blade with the powdered material without masking the compressor blade.

In accordance with another aspect of the present disclosure, a method for repairing a gas turbine compressor blade using microplasma spray coating is provided. The compressor blade can be repaired with the microplasma spray coating in an operating field without utilizing a dedicated spray coating facility in a manufacturing environment. A hand controlled and operated microplasma gun is utilized for applying the coating. Inert arc gas is injected through an electric arc generated by the microplasma spray gun. The inert gas is ionized with the electric arc to form a plasma gas stream. Powdered material is injected into the plasma gas stream which coats a localized area of the compressor blade without masking portions of the compressor blade.

Other applications of the present invention will become apparent to those skilled in the art when the following description of the best mode contemplated for practicing the invention is read in conjunction with the accompanying drawings.

Figure 1:
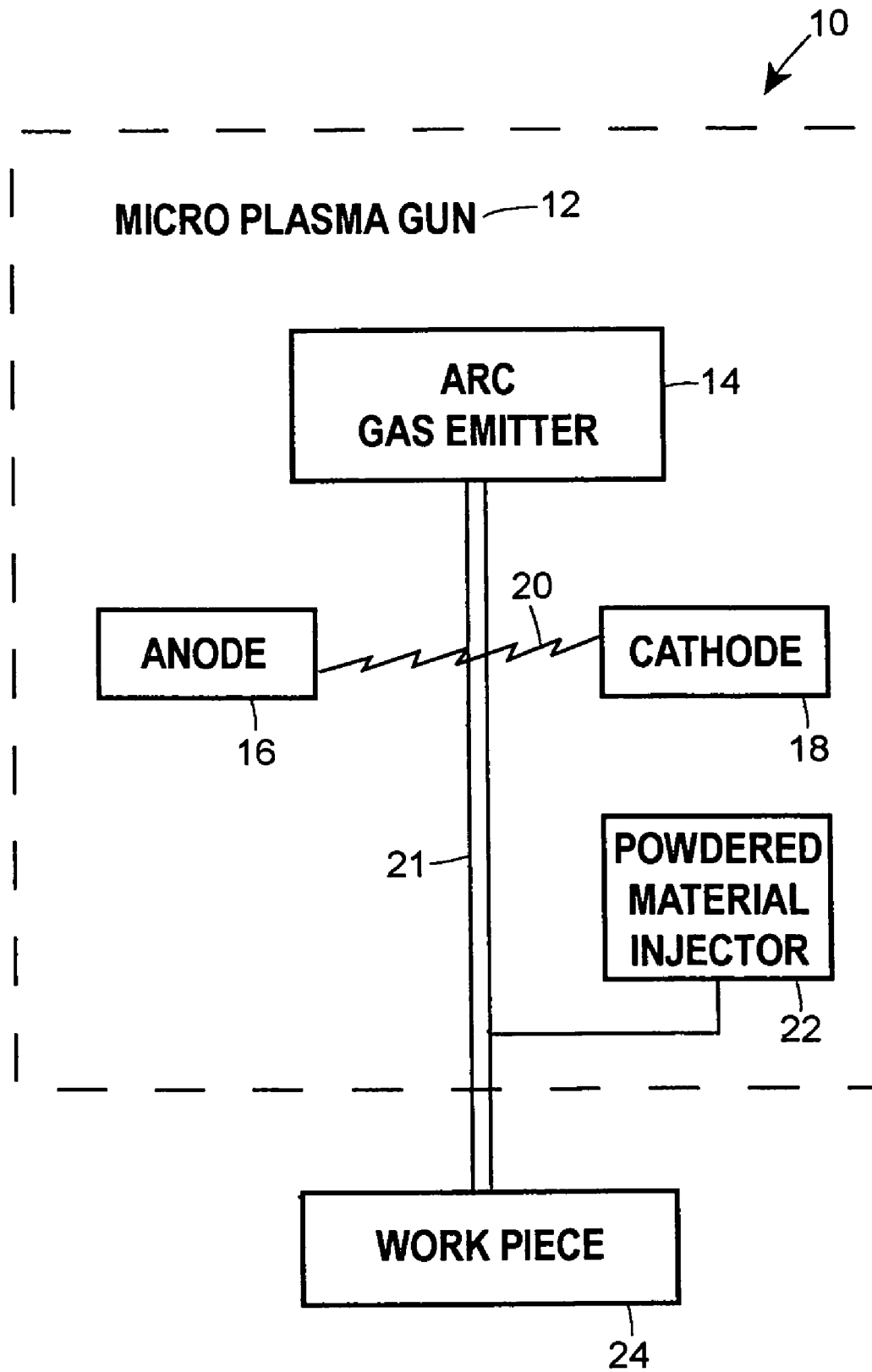
FIG. 1 is a schematic representing a microplasma spray gun and a workpiece.

While the following disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION OF THE DISCLOSURE

Referring now to FIG. 1, a microplasma spray apparatus 10 schematically represented by the dashed box outline is depicted. In generalized terms, the microplasma spray apparatus includes a microplasma gun 12 having an arc gas emitter 14, an anode 16, and a cathode 18. An electric arc 20 is generated between the anode 16 and cathode 18. A plasma stream 21 is formed when arc gas is injected from the arc gas emitter 14 through the arc 20. A powdered material injector 22 dispenses powdered material into the plasma stream which transports the powdered material to the workpiece 24. As a result, the powdered material forms a coating with a thickness of approximately 0.0015 to 0.006 inches in a desired location on the workpiece 24.

Figure 2:
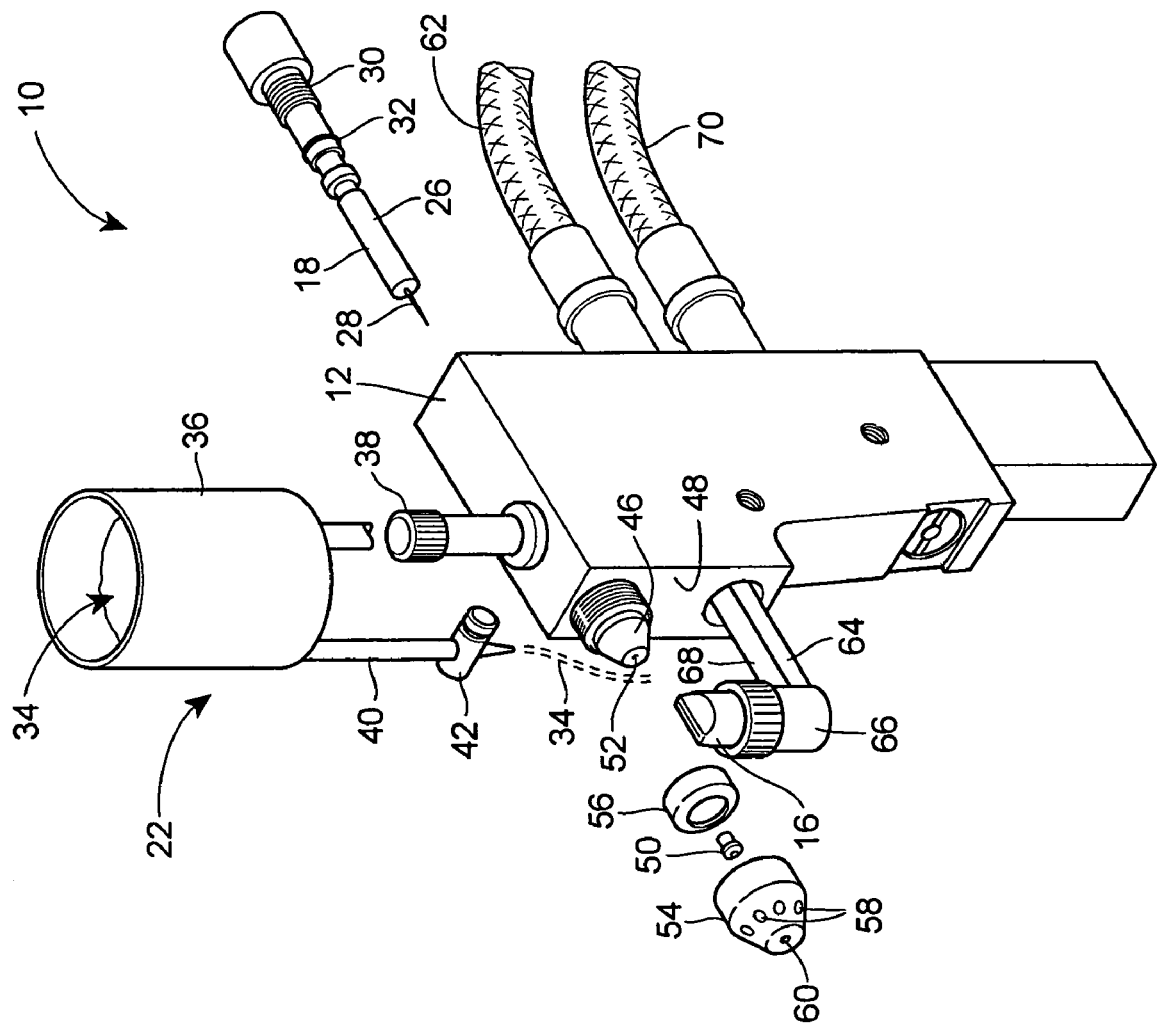
FIG. 2 is an exploded, perspective view of a microplasma spray apparatus constructed in accordance with the teachings of the disclosure.

While a number of different embodiments and structural variations can be constructed to practice such an invention, the following describes one currently known embodiment. Referring now to FIG. 2, an exploded view of such a microplasma spray apparatus is again referred to by reference numeral 10. As will be described in detail below, the microplasma spray apparatus 10 is operable for coating many things, including, but not limited to at least a portion of a compressor blade 72 in a gas turbine engine (not shown). However, it is to be understood that the teachings of disclosure can be used to coat myriad other surfaces, including those on aircraft, land-based vehicles, weapons, sea-faring vessels and the like.

In the depicted embodiment, the microplasma spray apparatus 10 includes the aforementioned microplasma gun 12 having an anode 16 and a cathode 18. The cathode 18 is further depicted to include an insulated body 26 with an electrode 28 extending therefrom. The cathode 18 can also include threads 30 for threadingly engaging the microplasma gun 12. The cathode 18 can also include an O-ring seal 32 to seal the leak path that is created at the interface between the cathode 18 and the microplasma gun 12.

In operation, an electric arc 20 (FIG. 1) is generated between the anode 16 and cathode 18 of the microplasma gun 12. Arc gas such as, but not limited to argon, is emitted into the electric arc formed between the anode 16 and the cathode 18. It should be understood that in practice the arc gas can be emitted prior to generating the electric arc. The electric arc ionizes the gas to create the plasma gas stream 21. The ionization process removes electrons from the arc gas, causing the arc gas to become temporarily unstable. The arc gas heats up to approximately 20,000° F. to 30,000° F. as it re-stabilizes. The plasma stream cools rapidly after passing through the electric arc.

A powdered material injector 22 injects powdered material 34 into the plasma gas stream 21. The powdered material 34 is heated and super plasticized in the plasma stream and is deposited on the compressor blade (not shown) where it cools and re-solidifies to form the coating. The powdered material injector 22 includes a powder hopper 36 for holding the powdered material 34. The hopper 36 is attached to the microplasma gun 12 via a connector 38 formed on the microplasma gun 12. The powder hopper 36 holds powdered material to be sprayed onto the compressor blade 72. The powdered material 34 is channeled through a discharge chute 40 and controlled by a valve 42 positioned in the discharge chute 40. The valve 42 can be mechanical or electromechanical as is known to those skilled in the art. Powder may also be injected into the plasma stream via a powder gas line from a standard powder feeder (not shown).

A nozzle shroud 46 positioned on a forward wall 48 of the microplasma gun 12 holds a nozzle insert 50 and permits the electrode 28 to extend through a center aperture 52 formed in the nozzle shroud 46. The nozzle insert 50 can be threadingly attached to an end of the nozzle shroud 46. A shield gas cap 54 is positioned adjacent the nozzle shroud 46. An insulator 56 is positioned between the shield gas cap 54 and the nozzle shroud 46 to electrically isolate the shield gas cap 54 from the nozzle shroud 46. The shield gas cap 54 can be pressed to fit onto the nozzle shroud 46 and over the insulator 56. The shield gas cap 54 includes a plurality of through apertures 58 for permitting shield gas to flow therethrough and shield the arc gas from ambient atmosphere. A center aperture 60 formed in the shield gas cap 54 permits high velocity arc gas to pass through and into the electric arc.

Cooling fluid, such as water or the like, is utilized to cool the microplasma gun 12. The cooling fluid is delivered to the microplasma gun 12 via a cooling fluid hose 62. The cooling fluid traverses through internal passages (not shown) in the microplasma gun 12 and flows through an inlet passage 64, into an anode holder 66 and back through an outlet passage 68. The cooling fluid reduces the temperature of the anode 16 during operation of the microplasma gun 12. The cooling flow rate may be approximately 1.0-1.5 gallons per minute. A second conduit 70 is connected to the microplasma gun 12. The second conduit may be operable for providing electrical power, arc gas, and shield gas to the microplasma gun 12.

Figure 3:
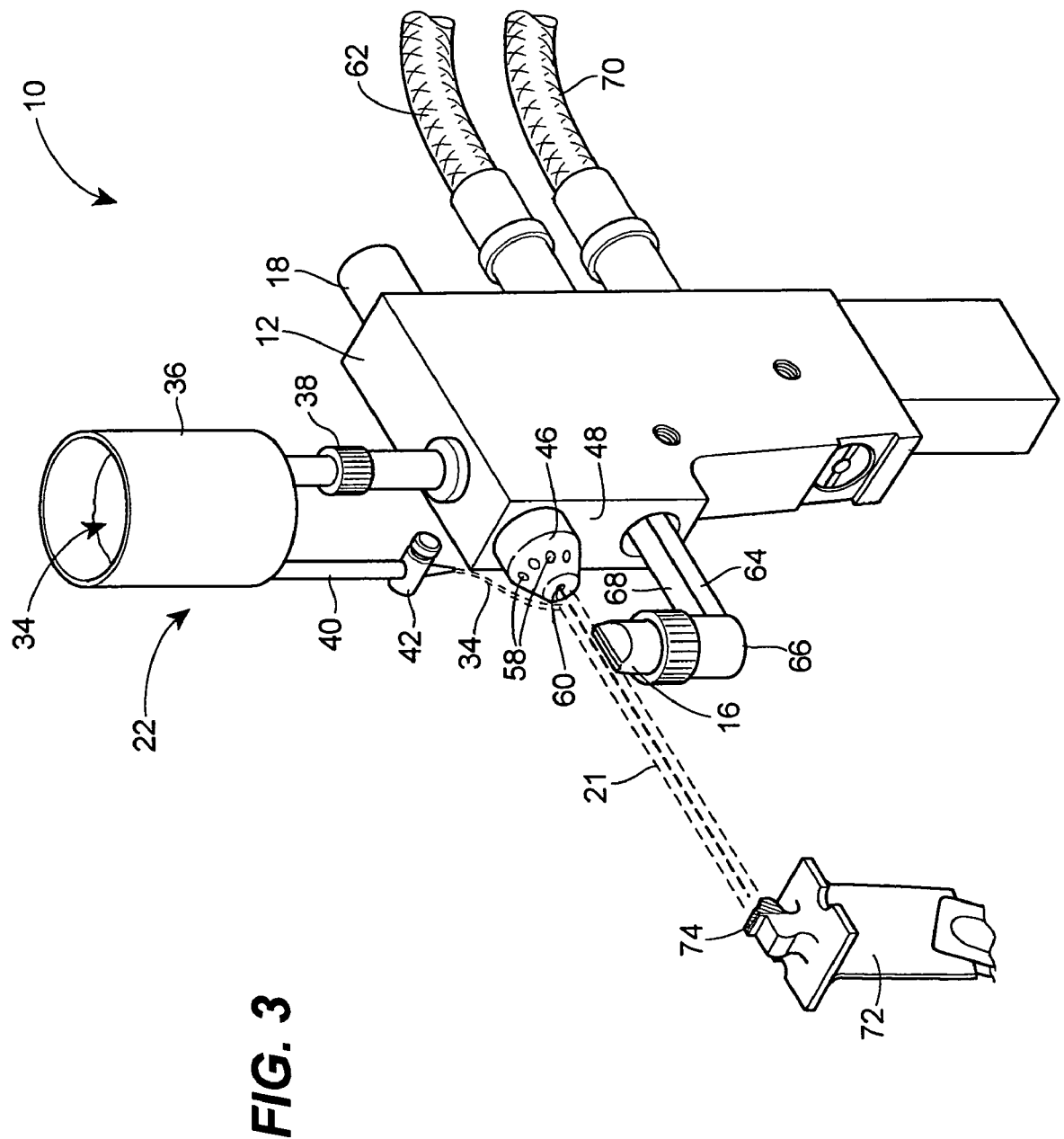
FIG. 3 is a perspective view of the microplasma spray apparatus of FIG. 1, applying a coating to a workpiece.

Referring now to FIG. 3, it is shown that a localized area of the compressor blade 72 such as a blade root 74 can be spray coated with powdered material 34. The plasma gas stream 21 is directed toward the portion of the compressor blade 72 to be coated. The microplasma gun 12 is operated at a relatively low power range of between approximately 0.5 Kilowatts and 2.5 Kilowatts. The low power output of the microplasma gun 12 significantly reduces the heat flow into the compressor blade 72 over that of conventional coating methods. The maximum surface temperature of the compressor blade 72 caused by the coating process is approximately 200° F. depending on the size of the blade. The microplasma gun 12 is operable for applying powdered material 34 to a thin wall area of the compressor blade 72 without distorting the compressor blade 72 because the low power output limits the localized stress caused by high thermal gradients.

The microplasma gun 12 can apply coating material in narrow strips of approximately 2 mm in width. This permits accurate surface coating even with a hand held device. The narrow strips of coating substantially eliminate the need for masking or otherwise covering the compressor blade 72 in areas where the coating is unwanted. The narrow spray pattern is controlled by the nozzle opening size. The hand held version of the microplasma gun 12 is so accurate that coating can be sprayed on components while they remain installed in an engine or the like.

The arc gas flow rate of the microplasma apparatus 10 may be between approximately 1.5 and 3 liters per minute. As stated above, the arc gas and shield gas are typically argon, but any suitable inert gas can be utilized as is known to those skilled in the art. The shield gas flow rate ranges between approximately 2 and 4 liters per minute for a typical application. The coating material for the compressor blade 72 can be a copper-nickel alloy, a copper-aluminum alloy, or other alloys suitable for compressor blades having operating temperatures that are typically below 1000° F., as is known to those skilled in the art.

The powder hopper 36 holds the powdered material 34 prior to being injected into the plasma gas stream 21 by the powder injector 22. The powdered material 34 can be injected into the plasma gas stream 21 either through gravity feed or through a pressurized system (not shown). The shut-off control valve 42 controls the powdered material 34 feed rate into the plasma gas stream 21. Powdered material 34 is transferred to the compressor blade 72 from between approximately 1 to 30 grams per minute. The microplasma gun 12 can typically apply the coating from distances ranging from approximately 1.5 inches to 6.5 inches to the compressor blade 72, but can vary depending on the coating application requirements. The microplasma spray gun 12 can be oriented between a positive 45° angle and a negative 45° angle relative to a normal axis of the compressor blade and still provide adequate material coating with a gravity feed system. A pressure feed system provides unlimited angles or orientation for the microplasma gun 12. The microplasma spray gun 12 generates a relatively low noise level that ranges from between 40 and 70 decibels due to the low power output, thereby making the apparatus 10 suitable for hand held application. Current U.S. government regulations require hearing protection when environmental noise reaches 85 decibels. The microplasma spray apparatus 10 can be hand held or alternatively held in an automated fixture (not shown) that is computer controlled.

Figure 4:
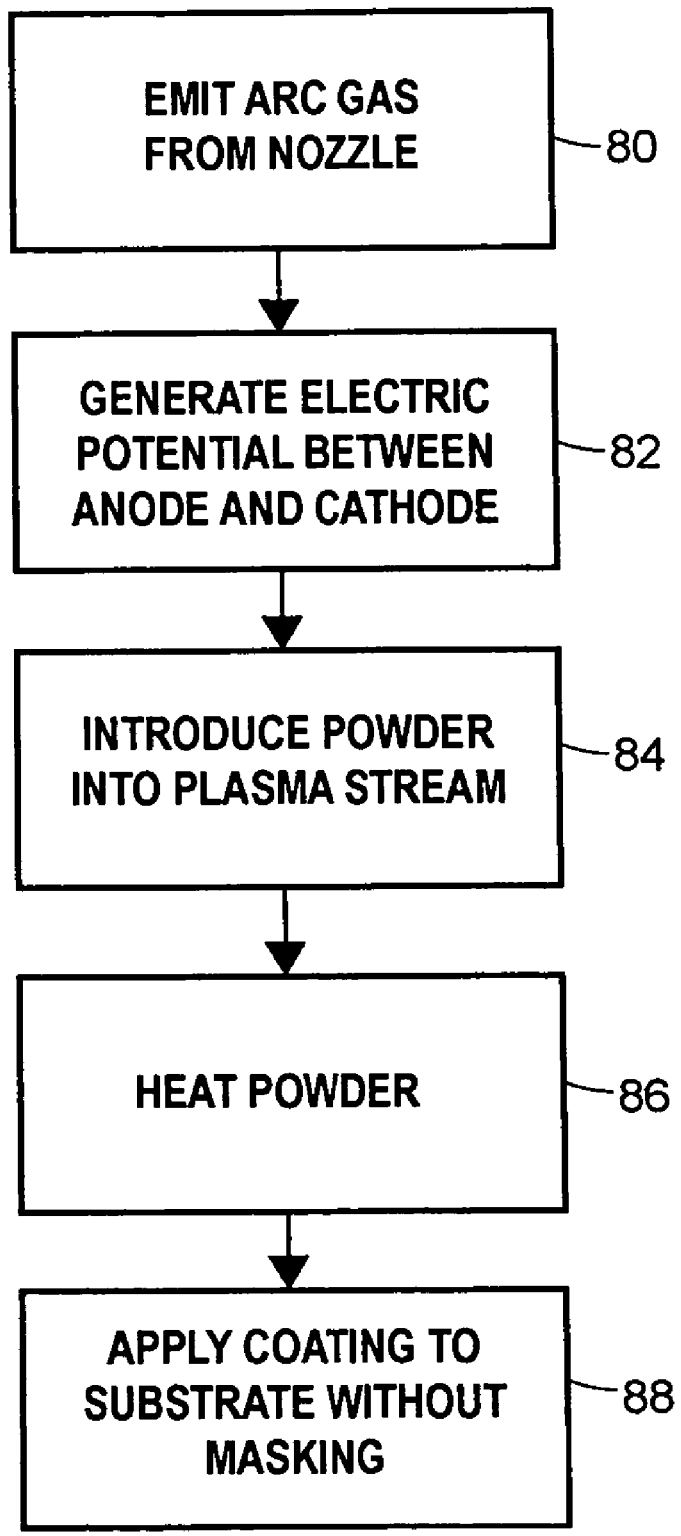
FIG. 4 is a flowchart describing the process for coating the microplasma spray coating a workpiece without masking.

Referring now to FIG. 4, a block diagram generally describing the operation of the microplasma spray apparatus 10 and the plasma spray coating process is illustrated. Initially, at block 80, arc gas is emitted from the nozzle insert 50. An electric potential is generated between the anode 16 and the cathode 18 of the plasma spray gun 12 and is directed through the arc gas, as described in block 82. Arc gas is directed through the electric potential to create the plasma stream 21. At block 84, powdered material 34 is injected into the plasma stream 21. At block 86, the plasma stream heats the powdered material 34 to a "super plasticized" condition such that the powdered material 34 is malleable when it is applied to a workpiece. At block 88, the powdered material 34 is applied to an unmasked substrate. The powdered material 34 then cools and solidifies as a hard coating on the substrate.

While the preceding text sets forth a detailed description of certain embodiments of the invention, it should be understood that the legal scope of the invention is defined by the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A microplasma spray apparatus for coating at least a portion of a component in a gas turbine engine, comprising:
   a microplasma gun including a housing, an external anode attached to an exterior surface of said housing, a cathode extending through said housing, and an arc generator for generating an electric arc between the anode and cathode;
   said anode and said cathode being spaced from said portion of said component being coated;
   a nozzle for emitting arc gas into the electric arc, the electric arc being operable for ionizing the gas to create a plasma gas stream; and
   a powder injector for injecting a powdered material selected from the group consisting of copper, nickel, aluminum-copper alloy and copper nickel, into the plasma gas stream;
   wherein said cathode includes an electrode extending therefrom and disposed through an aperture of said nozzle of said microplasma gun, and said anode is disposed within an anode holder mounted to said exterior surface of said microplasma gun and aligned opposite said nozzle, and
   wherein said powder injector comprises a hopper containing said powdered material, said hopper is located externally of said housing, and a chute for injecting said powdered material into said plasma gas stream, said chute having a valve positioned therein for controlling a feed rate of said powdered material into the plasma gas stream.

2. The microplasma spray apparatus of claim 1, wherein the microplasma gun operates at a relatively low power range between approximately 0.5 Kilowatts and 2.5 Kilowatts.

3. The microplasma spray apparatus of claim 1, wherein the component comprises a compressor blade and the microplasma gun is operable for applying the powdered material to thin walled portions of the compressor blade without distorting the blade.

4. The microplasma spray apparatus of claim 1, wherein a maximum surface temperature of the component caused by the coating process is approximately 200° F.

5. The microplasma spray apparatus of claim 1, wherein the nozzle applies the coating material in narrow widths of approximately 2 mm to the component.

6. The microplasma spray gun apparatus of claim 1, wherein the arc gas flow rate is between approximately 1.5 and 3 liters per minute.

7. The microplasma spray gun apparatus of claim 1, wherein the arc gas is inert.

8. The microplasma spray gun apparatus of claim 1, wherein the arc gas is argon.

9. The microplasma spray gun apparatus of claim 1, further including a shield gas cap having shielding gas injected therethrough, wherein the shielding gas flow rate is between approximately 2 and 4 liters per minute.

10. The microplasma spray gun apparatus of claim 9, wherein the shielding gas is inert.

11. The microplasma spray gun apparatus of claim 9, wherein the shielding gas is argon.

12. The microplasma spray gun apparatus of claim 1, wherein the powder feed rate is approximately between 1 and 30 grams per minute.

13. The microplasma spray gun apparatus of claim 1, further including a cooling system for cooling the anode during operation of the gun.

14. The microplasma spray apparatus of claim 1, wherein the microplasma gun generates a noise level of between approximately 40 and 70 decibels.

15. The microplasma spray apparatus of claim 1, further including a cathode shroud surrounding a portion of the cathode.

16. The microplasma spray apparatus of claim 15, further including the arc nozzle positioned on the cathode shroud for ejecting arc gas therethrough.

17. The microplasma spray apparatus of claim 16, further including a shield gas cap substantially encompassing the cathode shroud, the shield gas cap operable for providing shielding gas as a barrier between the arc gas and an ambient atmosphere.

18. The microplasma spray apparatus of claim 17, further including a shield cap insulator positioned between the shield gas cap and the cathode shroud.

19. The microplasma spray apparatus of claim 1, wherein said hopper is attached to said gun via a connector formed on the gun.

20. The microplasma spray apparatus of claim 1, wherein said nozzle includes a nozzle shroud positioned on a wall of said gun, said nozzle shroud having a center aperture which permits the electrode to extend therethrough, a shield gas cap positioned adjacent said nozzle shroud, an insulator positioned between the nozzle shroud and the shield gas cap to electrically isolate the shield gas cap from the nozzle shroud, and the shield gas cap having a plurality of through apertures for permitting shield gas to flow therethrough and shield the arc gas from ambient atmosphere, and said shield gas cap having a center aperture for permitting said arc gas to pass through and into the electric arc.

\* \* \* \* \*